US006178451B1

(12) United States Patent
Huitema et al.

(10) Patent No.: US 6,178,451 B1
(45) Date of Patent: Jan. 23, 2001

(54) COMPUTER NETWORK SIZE GROWTH FORECASTING METHOD AND SYSTEM

(75) Inventors: Christian Huitema, New York, NY (US); Samaradasa Weerahandi, Millington, NJ (US)

(73) Assignee: Telcordia Technologies, Inc., Morristown, NJ (US)

( * ) Notice: Under 35 U.S.C. 154(b), the term of this patent shall be extended for 0 days.

(21) Appl. No.: 09/185,002

(22) Filed: Nov. 3, 1998

(51) Int. Cl.[7] .................................................. G06F 15/173
(52) U.S. Cl. ........................... 709/224; 702/128; 702/179
(58) Field of Search ................... 709/223, 224, 709/226; 702/128, 179, 181

(56) References Cited

U.S. PATENT DOCUMENTS 5,778,069 * 7/1998 Thomlinson et al. .................. 380/25
5,778,172 * 7/1998 Riedle et al. .......................... 713/201
5,838,688 * 11/1998 Kadambi et al. ..................... 370/445

OTHER PUBLICATIONS

Internet Software Consortium, "Internet Domain Survey Background", http://www.isc.org/ds/new–survey.html, 2000.*
Internet Software Consortium, Internet Domain Survey, Jan. 1998, http://www.isc.org/ds/WWW–9801/report.html, 2000.*
Stephen et al., "How to Judge the Quality of a Survey", American Demographics, p. 42, Apr. 1990.*
Stillwater, "Study Puts US Online Population at 62 Million", Newsbytes News Network, Feb. 1998.*
Kendall et al., Dictionary of Statistical Terms, Hafner Publishing Company, 1960, p. 29, 1960.*
Eleftheriadis et al., "Address Management and Connection Control for Multicast Communication Applications", IEEE 1995, pp. 386–393.*
Lottor, M., "Internet Growth (1981–1991)", RFC 1296, Jan. 1992, pp. 1–9.*
Wiggins R.W., "Growth of the Internet", http://www.themesh.com/gedit12.html, Sep. 1995.*

* cited by examiner

Primary Examiner—Glenton B. Burgess
Assistant Examiner—Bradley Edelman
(74) Attorney, Agent, or Firm—Joseph Giordano

(57) ABSTRACT

A method is provided for estimating the size of a computer network such as the Internet. A computer generates a random sample of potential network addresses and then determines whether those sample addresses are currently allocated to computers on the network. Using samples taken at multiple points in time, the computer statistically models the growth of the network. The model has unknown parameters, and values of the parameters are estimated using previously sampled data. Using the estimated parameter values in the model, the computer estimates the number of computers on the network at historical points in time. The computer also uses the model to forecast the number of computers on the network at future points in time.

3 Claims, 5 Drawing Sheets

COMPUTER NETWORK SIZE GROWTH FORECASTING METHOD AND SYSTEM

BACKGROUND OF THE INVENTION

The present invention relates generally to estimating the size of computer networks and, more particularly, to estimating and forecasting growth in the number of Internet hosts registered in the Internet Domain Name Service (DNS).

Every computer with a permanent connection to the Internet is identified by an Internet Protocol (IP) address. As shown in FIG. 1, examples of computers with IP addresses are host computer 10, server 20, workstation 30 (connected to Internet Backbone 50 through LAN 35), and Internet Service Provider (ISP) 40. An IP address comprises four parts, e.g., "a.b.c.d," which corresponds to the address of host 10 in FIG. 1. Each part is an integer between 0 and 255, so that there are $2^8=256$ possible values for each of the four parts, and each part can be represented using 8 bits. Therefore, there are $2^{32}$ possible IP addresses. Each part of the address becomes increasingly machine-specific. For example, the first part specifies a geographic region, the second part specifies a service provider or organization such as a university, the third part specifies a group of computers, and the fourth part specifies the machine itself.

In addition to host computers, other pieces of computer equipment have their own IP addresses, e.g., server 20 has address efg.h, and workstation 30 has address i.j.k.l. Individual computers such as PCs, however, do not have permanent IP addresses. They only receive an IP address temporarily by connecting to an ISP such as ISP 40, which has an IP address for each modem in its modem bank.

Every computer on the Internet also has an alphanumeric name, referred to as a domain name, and the Domain Name System (DNS) contains, among other information, mappings between IP addresses and domain names. The DNS is a distributed database held by systems running name server software. There is a hierarchy of DNS servers, with servers at the lowest level containing name-to-address mappings for a group of hosts, and servers at increasingly higher levels containing data for larger groups of hosts. At the top level are root name servers that hold all data for the top-level domains, e.g., ".com," ".org," and geographical domains such as ".uk" and ".jp." Whenever a user on a local computer enters a domain name, the local computer contacts a DNS server, possibly on the local computer itself. If the first DNS server cannot resolve the domain name by finding its IP address, the DNS server contacts an authoritative server higher up the hierarchy. That server, in turn, contacts an even higher-level DNS server if it cannot resolve the domain name.

For reverse mapping from IP addresses to domain names, there is a pseudo-domain called IN-ADDR.ARPA. This domain contains exactly one PTR (pointer) record for each IP address. Because the highest order of significance in the naming system is on the right, the notation for addresses is reversed in IN-ADDR.ARPA. For example, the IP address 120.76.108.14 would have a reverse domain entry of 14.108.76.120.IN-ADDR.ARPA.

The size of the Internet can be determined based only on one directly measurable quantity—the number of computers registered in DNS. One method for determining the number of computers registered is to perform an exhaustive count using DNS zone transfers. In a DNS zone transfer, a DNS server requests a download of information from another server in the same zone, or portion of the domain space. Usually a server requests a download from a server that is higher in the hierarchy. By requesting DNS zone transfers throughout the Internet, one server can actually count the number of computers registered. One problem with this approach, however, is that as the Internet grows, exhaustive surveys take longer and longer to perform, so that results for one month may not be available until at least the following month. A second problem with this approach is that zone transfers put a heavy load on servers and are considered to be intrusive. As a result, many servers have banned zone transfers, causing estimates of Internet size based on DNS zone transfers to become less and less accurate.

Furthermore, current methodologies for estimating the size of the Internet provide only historical measurements. They do not provide a forecast of future Internet growth.

It is desirable, therefore, to provide a method for accurately estimating the number of registered hosts on the Internet. It is also desirable to provide a method for forecasting the growth in the number of registered hosts on the Internet. It is also desirable to provide a method for estimating and forecasting the size of the Internet by arbitrary segment, e.g., based on the top level or second level domain name. It is even more desirable to provide a method that quickly and accurately estimates current Internet size and does not underestimate the number of hosts.

DESCRIPTION OF THE INVENTION

The present invention satisfies those desires and other desires by providing a methodology for estimating and forecasting the number of Internet hosts based on a statistical analysis of a random sampling of Internet addresses.

A method consistent with an embodiment of the present invention for estimating growth in the number of computers in a network comprises the steps of modeling network growth based on a statistical model, determining a probability from the statistical model, and estimating network growth based on the determined probability. In particular, the statistical model may be a birth rate model, and the probability may be a birth probability. A method consistent with an embodiment of the present invention, wherein the statistical model has unknown parameters, further comprises the steps of obtaining a sample of the number of computers in the network and estimating the value of the unknown parameters based on the sampled number of computers.

A method consistent with an embodiment of the present invention for sampling the number of computers in the network comprises the steps of randomly generating a plurality of potential computer addresses, determining whether each of the addresses has been allocated to a computer, and statistically analyzing the number of allocated and non-allocated addresses to estimate the number of computers.

The above desires, and other desires, features, and advantages of the present invention will be readily appreciated by one of ordinary skill in the art from the following detailed description of the preferred implementations when taken in connection with the accompanying drawings.

BEST MODE FOR CARRYING OUT THE INVENTION

Reference will now be made in detail to the presently preferred embodiments of the invention, examples of which are illustrated in the accompanying drawings. Wherever possible, the same reference numbers will be used throughout the drawings to refer to the same or like parts.

Figure 1:
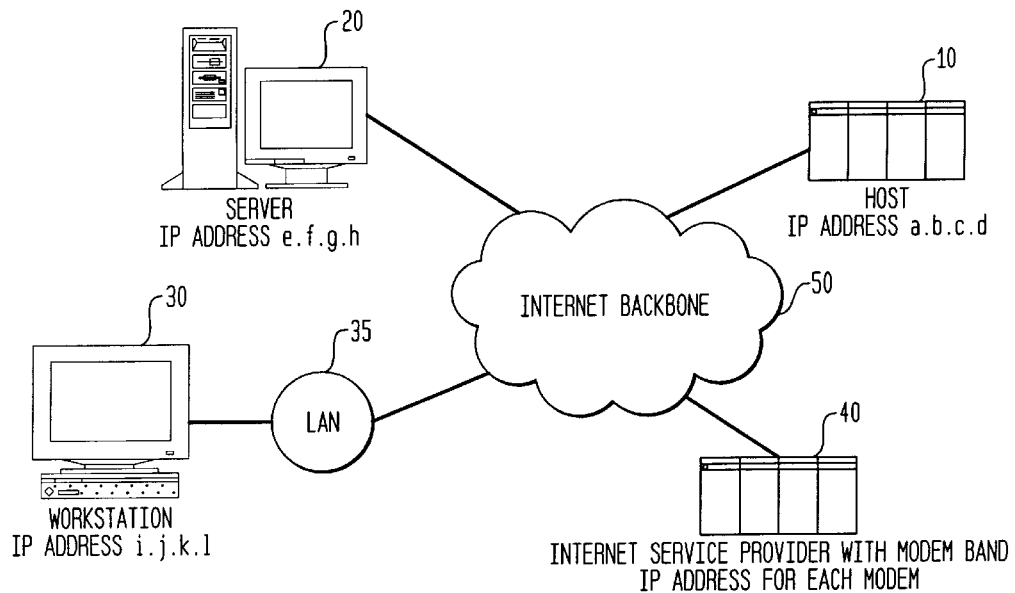
FIG. 1 is a high level block diagram of a computer network in which our invention may be employed.
Figure 2:
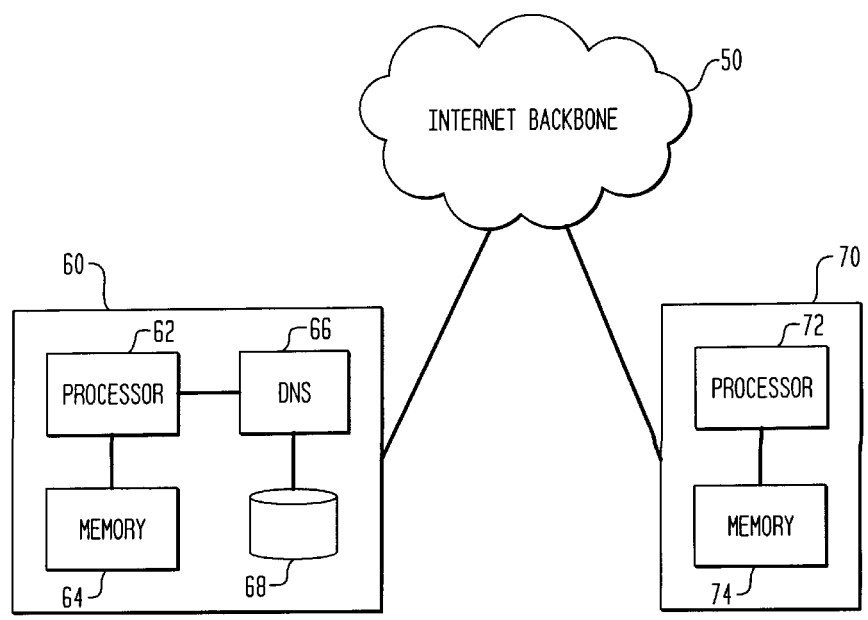
FIG. 2 is a high level block diagram of a computer on which methods for estimating and forecasting the size of a computer network in accordance with the present invention may be implemented.

Methods in accordance with embodiments of the present invention may be executed by a computer on the Internet that has access to DNS servers containing Internet computer registration information. For example, as illustrated in FIG. 2, methods in accordance with the present invention may be stored as software in memory 64 and can be executed by processor 62 within computer 60, which has access to Internet Backbone 50. Memory 64 may be implemented with any type of computer-readable medium, such as any electronic, magnetic, or optical read/write storage device. As described earlier, a computer may operate as a DNS server if it contains DNS software that maintains a local database of network registration information, including IP addresses and domain names. For example, computer 60 in FIG. 2 contains DNS software module 66 that maintains database 68. Thus, whenever computer 60 requires registration information of other computers, it first accesses database 68 through DNS software module 66. If database 68 does not contain the required information, computer 60 accesses other DNS servers (not shown) connected to the Internet. Other computers, such as computer 70, do not operate as DNS servers and must access other DNS servers connected to the Internet to obtain address/domain name information. Methods in accordance with the present invention may be executed by computer 70 because computer 70 has access to DNS servers through Internet Backbone 50. Methods in accordance with the present invention may be stored as software in memory 74 and can be executed by processor 72 within computer 70. Memory 74 may be implemented with any type of computer-readable medium, such as any electronic, magnetic, or optical read/write storage device.

Methods for estimating and forecasting the size of a computer network in accordance with the present invention include at least two steps: generating a random sample of possible network addresses and determining whether they are in use by the network; and statistically modeling network growth and using the results of the sampling step to estimate the past and present size of the network and to forecast future growth of the network. Embodiments of these steps will now be presented in detail.

Sampling

Figure 3:
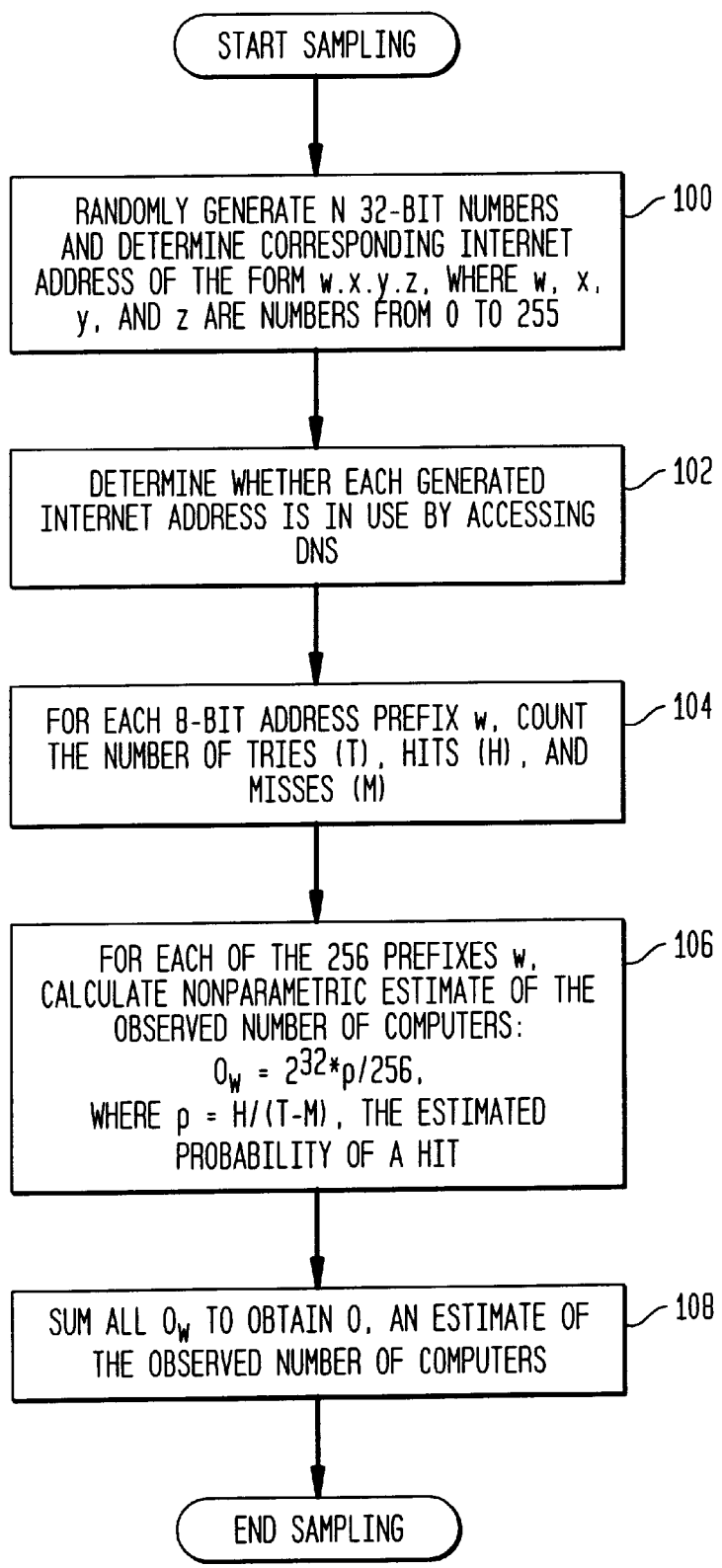
FIG. 3 is a flow chart of a method for sampling the size of a computer network in accordance with an embodiment of the present invention.

FIG. 3 illustrates a flow chart of the steps that a computer, for example computer 60 or 70 in FIG. 2, preferably performs to sample the number of computers registered on the network. Although FIG. 3 illustrates a method in accordance with an embodiment of the present invention in which the computer network is the Internet and each computer has an address of the form a.b.c.d, it should be understood by one skilled in the art that the method can be used to sample the number of computers in any network with a registration system for numerical addresses.

First, the computer randomly generates N 32-bit numbers and determines their corresponding IP addresses of the form w.x.y.z, where w, x, y, and z are integers between 0 and 255, inclusive (step 100). For example, the 32-bit number 00010111011100010101010011100001 (i.e., 39,964,385) corresponds to the IP address 23.113.84.225. The computer preferably executes a complete random number generator continuously seeded with an external source of random variables to ensure a high degree of randomness. Next, the computer determines whether each of the N generated addresses is in use by the network by accessing DNS (step 102). An address w.x.y.z is determined to be in use if there is a PTR record in IN-ADDR.ARPA for z.y.x.w. If the computer does not operate its own DNS server or cannot determine from its local DNS server whether the address is allocated or nonallocated, the computer accesses another DNS server, usually one higher in the hierarchy.

If a DNS server containing registration information for a particular IP address is down, then the computer may not be able to determine whether the address is allocated or nonallocated, resulting in an inconclusive attempt. If such inconclusive attempts due to network losses were equally likely for all addresses, the inconclusive data could simply be discarded, and only the addresses identified as allocated and nonallocated would be counted to estimate the present network size. However, inconclusive attempts actually occur more frequently for allocated addresses than for nonallocated addresses because a local DNS server is more likely to recognize an address as nonallocated. For an allocated address, the risk of an inconclusive result due to network losses increases as the search goes further beyond the local DNS server. Thus, network losses may bias the sampling results downward.

In accordance with an embodiment of the present invention, the problem of biased sampling is corrected by segmenting the randomly generated addresses into 256 segments by their 8-bit prefixes w and keeping counts of trials T (randomly generated potential network addresses), hits H (addresses successfully identified as allocated), and misses M (inconclusive attempts resulting from network losses) for each of the 256 8-bit prefixes w (step 104). Since each of the 256 segments is nearly homogenous with respect to inconclusive attempts due to network losses, the number of computers can be estimated for each segment, and the total of the 256 segment estimates provides an estimate of the total number of computers on the Internet. For each of the 256 8-bit prefixes w, a nonparametric estimate of the number of computers observed is calculated as (step 106):

$$O_w = 2^{32} * p / 256, \quad (1)$$

where $p = H/(T-M)$ is the estimated probability of a hit, i.e., successful identification of an address as allocated. According to a statistical technique for large sample sizes known in the art, the standard error of this nonparametric estimate is:

$$SE(O_w) = \frac{2^{32}}{256}\sqrt{\frac{p(1-p)}{(T-M)}}, \quad (2)$$

and the 95% confidence interval is given by:

$$O_w \pm 1.96 * SE(O_w). \quad (3)$$

Summing the $O_w$ for all 256 segments provides an estimate of the total number of computers on the Internet (step 108).

In accordance with an embodiment of the present invention, the computer performing the sampling may also compile a list of the actual addresses found to be allocated, possibly including their associated domain names. In conjunction with external information, this allows a sampling of the population of hosts belonging to specific categories. For example, the found addresses can be segmented by top level domain name. The estimates $O_w$ in step 106 are calculated based on the tries, hits, and misses for addresses belonging to a domain. The estimate O in step 108 is the sum of all the $O_w$ in the domain. Similarly, estimates of the number of computers belonging to a market segment can be determined if the market segment is identified by address or domain name characteristics.

Statistical Modeling

In accordance with an embodiment of the present invention, the estimate of the number of computers on the Internet obtained by the sampling method described above is then statistically analyzed to estimate the historical size or forecast the future size of the Internet. Methods in accordance with the present invention use a service diffusion methodology to estimate and forecast size. This methodology treats the process of new host computers joining the Internet as a birth process in which the birth rate depends on, inter alia, the current size of the network itself. This is known in the art as a learning or imitation effect. With estimates of the number of computers at periodic time intervals, e.g., monthly estimates, the process can be treated as a discrete time Markov process.

Figure 4:
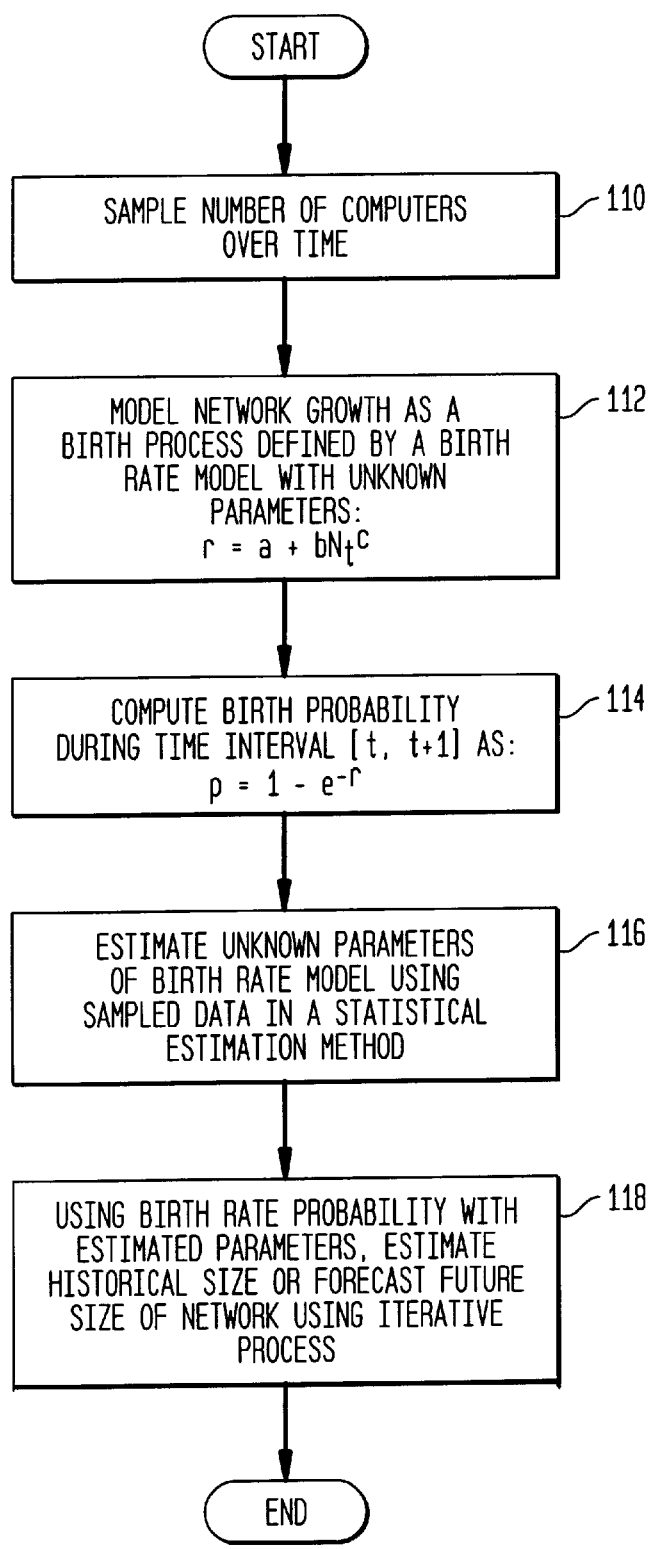
FIG. 4 is a high level flow chart of a method for estimating and forecasting the size of a computer network in accordance with an embodiment of the present invention.

FIG. 4 illustrates a flow chart of the steps a computer, for example computer 60 or 70 in FIG. 2, which computer preferably performs to estimate past size or forecast future size of the network. First, the computer samples the number of computers in the network over time (step 110). That is, at periodic time intervals, the computer determines an estimate of the number of computers in the network, preferably according to the process shown in FIG. 3. Next, network growth is modeled as a birth process defined by a birth rate of the form:

$$r = a + bN_t^c, \quad (4)$$

where a, b, and c are unknown parameters, and $N_t$ is the number of computers estimated from the sampling process at time t (step 112). While the birth rate could also be modeled as linear in the size of the network, the model in equation (4) has been shown to provide a better fit to actual data and to lead to more robust forecasts. The birth probability during the time period [t, t+1] can be written as the transition probability of the birth process, i.e., as:

$$p = 1 - e^{-r} \quad (5)$$

Figure 5:
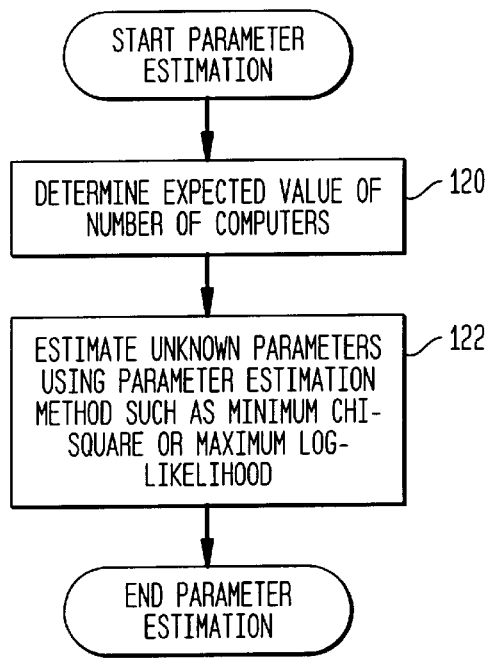
FIG. 5 is a flow chart of a method for estimating parameters in accordance with an embodiment of the present invention.
Figure 6:
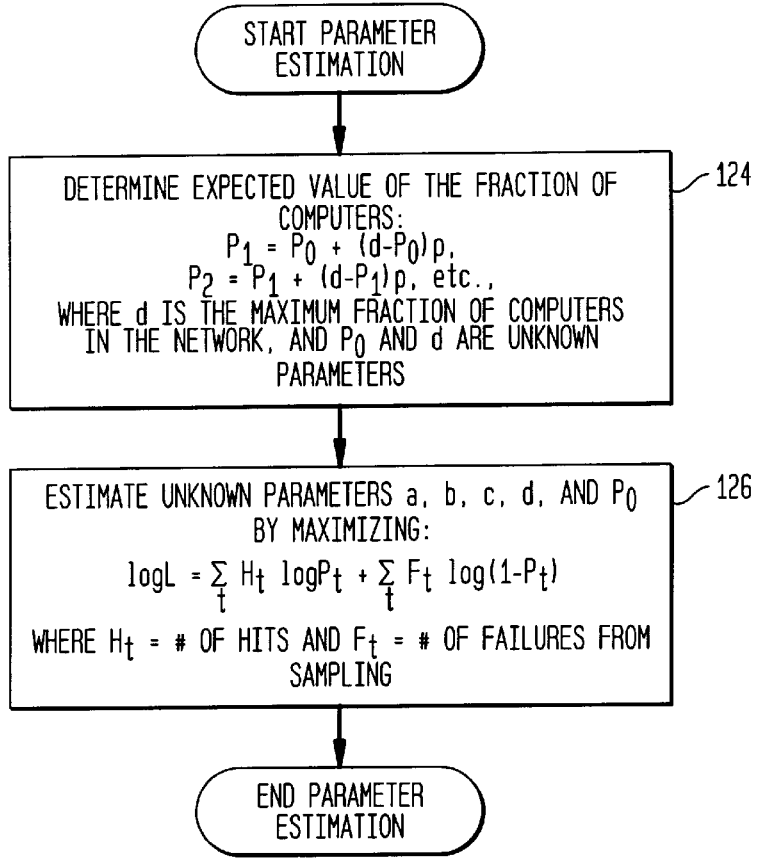
FIG. 6 is a detailed flow chart of a method for estimating parameters in accordance with an embodiment of the present invention.
Figure 7:
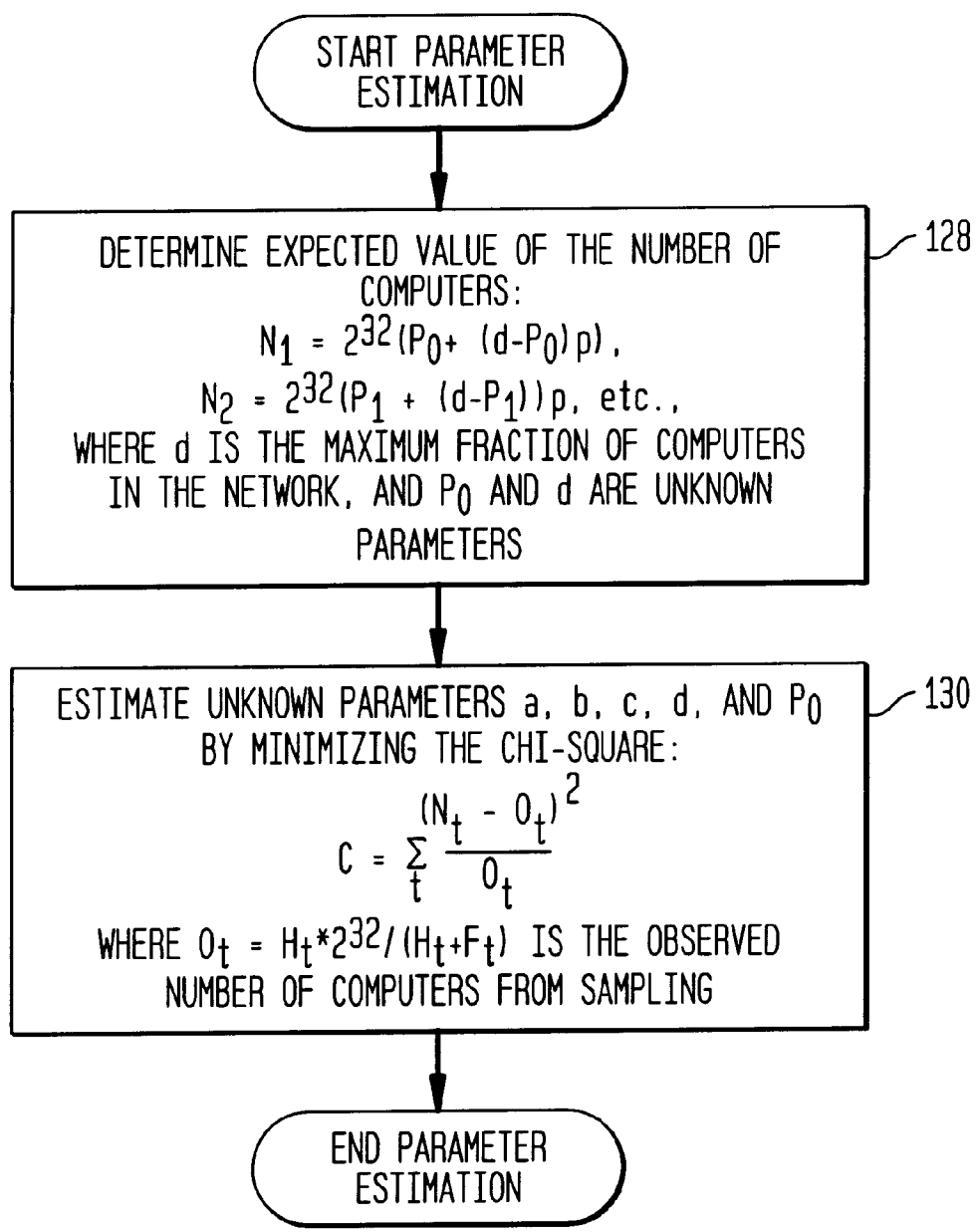
FIG. 7 is a detailed flow chart of a method for estimating parameters in accordance with another embodiment of the present invention.

After modeling network growth, a method in accordance with an embodiment of the present invention uses a statistical estimation method to estimate the unknown parameters of the model using sampled data obtained from a sampling method, such as the one illustrated in FIG. 3 (step 116). FIG. 5 illustrates in more detail the substeps of a parameter estimation step to be used in accordance with an embodiment of the present invention. FIGS. 6 and 7 are two embodiments of the parameter estimation step shown in FIG. 5.

In FIG. 5, the first substep of parameter estimation is to determine the expected value of the number of computers on the network as a function of the unknown parameters (step 120). For example, given $P_0$, the fraction of the potential number of computers (i.e., the fraction of the total number of possible addresses) that are on the network at time 0, the expected fraction of computers $P_t$ at time t=1, 2, 3, ... can be written in terms of the birth probability (equation (5)) iteratively as:

$$P_1 = P_0 + (d - P_0)p \quad (6)$$
$$P_2 = P_1 + (d - P_1)p$$
$$P_3 = P_2 + (d - P_2)p,$$

where d is the maximum possible fraction of computers on the network (i.e., the maximum penetration into the total number of possible addresses), and d and $P_0$ are unknown parameters. For the Internet, the expected values $P_0$, $P_1$, $P_2$, etc. are related to the expected value of the number of computers on the network by the equations:

$$N_0 = P_0 * 2^{32} \quad (7)$$
$$N_1 = P_1 * 2^{32}$$
$$N_2 = P_2 * 2^{32}$$

Given the iterative equations (6), the unknown parameters a, b, c, d, and $P_0$ can be estimated using a well-known statistical parameter estimation method, such as minimum chi-square or maximum log-likelihood (step 122).

FIG. 6 is a flowchart illustrating an embodiment of the present invention in which the parameter estimation method is a maximum log-likelihood method. First, the expected value of the fraction of computers on the network is determined iteratively as a function of d and $P_0$, which are unknown parameters, and of p, the transition probability from equation (5), which is a function of unknown parameters a, b, and c (step 124). Then the unknown parameters are estimated using a statistical method known in the art by maximizing the function:

$$\log L = \sum_t H_t \log P_t + \sum_t F_t \log(1 - P_t) \quad (8)$$

where $H_t$ is the number of hits (addresses successfully identified as allocated) at time t and $F_t$ is the number of failures at time t, both obtained over multiple time periods from a sampling method (step 126). Using the sampling method illustrated in FIG. 3, $F_t$ is equal to the total number of trials minus the number of inconclusive attempts minus the number of hits, i.e., $F_t = T_t - M_t - H_t$.

FIG. 7 is a flowchart illustrating an embodiment of the present invention in which the parameter estimation method is a minimum chi-square method. First, the expected value of the number of computers on the network is determined iteratively as a function of d and $P_0$, which are unknown parameters, and of p, the transition probability from equation (5), which is a function of unknown parameters a, b, and c (step 128). The number of computers on the network is related to the fraction of computers on the network by equation (7). Then the unknown parameters are estimated using a statistical method known in the art by minimizing the chi-square function:

$$C = \sum_t \frac{(N_t - O_t)^2}{O_t} \qquad (9)$$

where $N_t$ is the expected value of the number of computers on the network at time t, and $O_t$ is the observed number of computers from the sampling method, both obtained over multiple time periods from a sampling method (step 130). Using the sampling method illustrated in FIG. 3, $O_t$ is equal to the total possible number of addresses, multiplied by the ratio of hits $H_t$ to the sum of hits $H_t$ and misses $F_t$, i.e., $O_t = H_t/(H_t + F_t) = H_t/(T_t - M_t)$.

Referring again to FIG. 5, after the unknown parameters a, b, c, d, and $P_0$ have been estimated using a statistical estimation method (step 116), the iterative equations (6) and (7) can be used to estimate the number of computers on the network historically up to the present time or to forecast the number of computers on the network at future points in time (step 118). That is, once the parameters of the network growth model have been determined, the model represents past growth and can be used to compute estimated future growth.

In another embodiment in accordance with the present invention, the method illustrated in FIGS. 4–7 can be used to estimate historical size and forecast future growth for specific categories of computers, such as market segments or groups of top level domain names. Rather than using sampled data representing the size of the entire network, the method of FIG. 4 uses sampled data belonging to the specific category of interest, as described in connection with FIG. 3. Each category may have different values of the unknown parameters, since each category may grow at a different rate.

It will be apparent to those skilled in this art that various modifications and variations can be made to the estimation and forecasting scheme of the present invention without departing from the spirit and scope of the invention. For example, methods according to the present invention can be used to estimate and forecast the size of any large computer network in which the number of potential network addresses is known. Also, other parameter estimation methods in addition to the maximum log-likelihood and minimum chi-square methods may be used. Other embodiments of the invention will be apparent to those skilled in this art from consideration of the specification and practice of the invention disclosed herein. It is intended that the specification and examples be considered exemplary only, with the true scope and spirit of the invention being indicated by the following claims.

What is claimed is:

1. A method for operating one of a plurality of computers connected to an Internet network to obtain in real time an estimate of the number of said computers connected to said Internet network, each of said computers including a memory and a processor and at least certain of said computers including a Domain Name Service software module that maintains a Domain Name Service database and each of said computers being registered in at least one of said Domain Name Service data-bases, said method comprising the steps of:

randomly generating a plurality of computer addresses;

accessing one of said Domain Name Service databases to determine the number of said plurality of computer addresses allocated to a computer connected to said Internet network and the number not so allocated; and in said one computer, statistically analyzing said number of addresses determined to be allocated to a computer connected to said Internet network and said number of said addresses not so allocated to determine the estimate of the number of computers connected to said Internet network.

2. The method in accordance with claim 1 further comprising preventing biasing due to inconclusive attempts by said accessing step, said method further comprising the steps of:

segmenting said plurality of randomly generated addresses; and for each of said segments, in said one computer keeping count of the number of access trials by said accessing step, the number of hits comprising addresses successfully identified as allocated, and the number of misses comprising inconclusive attempts resulting from network losses.

3. The method in accordance with claim 1 wherein said step of statistically analyzing includes utilizing a birth rate model and in said one computer determining a birth rate from said birth rate model and determining a birth probability from said birth rate.

* * * * *